(12) United States Patent
Hart et al.

(10) Patent No.: US 7,966,926 B2
(45) Date of Patent: Jun. 28, 2011

(54) FUNNEL BLOCKING APPARATUS AND METHODS OF USE

(75) Inventors: Burton L. Hart, Auburn, IL (US); Kurt Powell, Auburn, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 800 days.

(21) Appl. No.: 10/551,542

(22) PCT Filed: Apr. 5, 2004

(86) PCT No.: PCT/US2004/010458
§ 371 (c)(1),
(2), (4) Date: Sep. 29, 2005

(87) PCT Pub. No.: WO2004/098174
PCT Pub. Date: Oct. 21, 2004

(65) Prior Publication Data
US 2006/0191421 A1 Aug. 31, 2006

(51) Int. Cl.
*A47J 31/00* (2006.01)
(52) U.S. Cl. .................. 99/279; 99/307; 99/323
(58) Field of Classification Search .................. 99/279, 99/323, 307, 306, 304, 302 R
See application file for complete search history.

(56) References Cited

U.S. PATENT DOCUMENTS

| | | | |
|---|---|---|---|
| 3,343,478 A | | 9/1967 | Hausam |
| 3,384,004 A | * | 5/1968 | Perlman et al. ............. 99/289 R |
| 3,511,166 A | | 5/1970 | Bixby, Jr. |
| 5,000,082 A | | 3/1991 | Lassota |
| 5,111,740 A | | 5/1992 | Klein |
| 5,331,885 A | | 7/1994 | Lassota |
| 5,794,519 A | * | 8/1998 | Fischer ........................... 99/295 |
| 5,875,704 A | * | 3/1999 | Levi et al. ....................... 99/295 |

FOREIGN PATENT DOCUMENTS

EP 0028772 * 5/1981 ..................... 99/307

* cited by examiner

*Primary Examiner* — Reginald L Alexander
(74) *Attorney, Agent, or Firm* — Barnes & Thornburg LLP

(57) ABSTRACT

Disclosed is a blocking device for use with a beverage making machine of the type having a housing (22) and a funnel (30) positionable relative to the housing. The blocking device (40, 40a, 40b) prevents unintended disengagement of a funnel from a corresponding housing to which at least a portion of the blocking device is attached. The blocking device includes a first engager (16) and a second engager (18). The first and second engagers are engageable when positioning a funnel on a housing. The first and second engagers are selectively disengageable when removing a funnel from a housing. The blocking device as disclosed also includes a method of retaining a funnel on a housing and a kit for attaching a blocking device to a beverage making machine which does not include a blocking device.

27 Claims, 8 Drawing Sheets

FUNNEL BLOCKING APPARATUS AND METHODS OF USE

BACKGROUND

The present disclosure relates to apparatus and methods of retaining and releasing funnels or other structures used in conjunction with beverage preparation equipment.

A variety of equipment has been developed for use in making or producing beverages. Such beverage preparation equipment or beverage making machines may include reconstituting or diluting a concentrated substance, brewing a beverage from a beverage brewing substance such as coffee, tea, or herbs as well as other methods of producing brewed beverages or other food products. Terms including beverage, beverage making and brewing as used herein are intended to be broadly defined as including but not limited to the brewing of coffee, tea, herbs and any other brewed beverage. This broad interpretation is also intended to include, but is not limited to any process of infusing, steeping, reconstituting, diluting, dissolving, saturating or passing a liquid through or otherwise mixing or combining a beverage substance with a liquid such as water without a limitation to the temperature of such liquid unless specified. This broad interpretation is also intended to include, but is not limited to beverage substances such as ground coffee, tea, herbs, liquid beverage concentrate, powdered beverage concentrate, freeze dried coffee or other beverage concentrates, to obtain a desired beverage or other food.

A group of such beverage and food preparation equipment may use a funnel or other container or holder in the production of the beverage. By way of example, but not limitation, we will refer to beverage brewing equipment or beverage making equipment in the present disclosure. This disclosure is not limited to making beverages by brewing but will be broadly interpreted to include any form of beverage making equipment. In many forms of beverage making equipment a funnel or substance holder is included for retaining a beverage making substance for mixing with heated water. Additionally, beverage making equipment for reconstituting or mixing freeze-dried coffee with heated water has been developed which also uses a funnel.

Beverage brewing equipment might include a housing having a base, a trunk and a hood. Generally, in this example, the hood is a portion of the housing extending from the trunk a dimension and overhanging the base. A beverage carafe is placed underneath the hood with the funnel being attached to the hood above the carafe. Generally, such funnels have an outwardly extending flange. An underside of the hood is provided with two channels or rails which are oriented for receiving the flange of the funnel therein. In this manner, the funnel can be slidably mounted by positioning the flange between the opposed channels.

It may be desirable to retain the funnel in the position under the hood, engaged in the rails, throughout the beverage making or brewing process. By retaining the funnel in this position, the escape of steam from the brewing process may be reduced or prevented. This helps to retain the steam in the funnel for subsequent condensation and draining from the funnel. This also reduces or eliminates the escape and intrusion of steam into the brewer housing. Retaining the funnel in a desired position under the hood during the brewing process also helps eliminate inadvertent attempts to remove the funnel during the brewing process which can result in spillage of material into the carafe or on the base of the brewer. It would be desirable to retain the funnel in the position under the hood to eliminate having to clean up any mess created by inadvertent spilling of brewing substance or beverage.

Additional features will become apparent to those skilled in the art upon consideration of the following detailed description of drawings.

BRIEF DESCRIPTION OF THE DRAWINGS

The detailed description particularly refers to the accompanying figures in which.

DETAILED DESCRIPTION OF THE DRAWINGS

Figure 1:
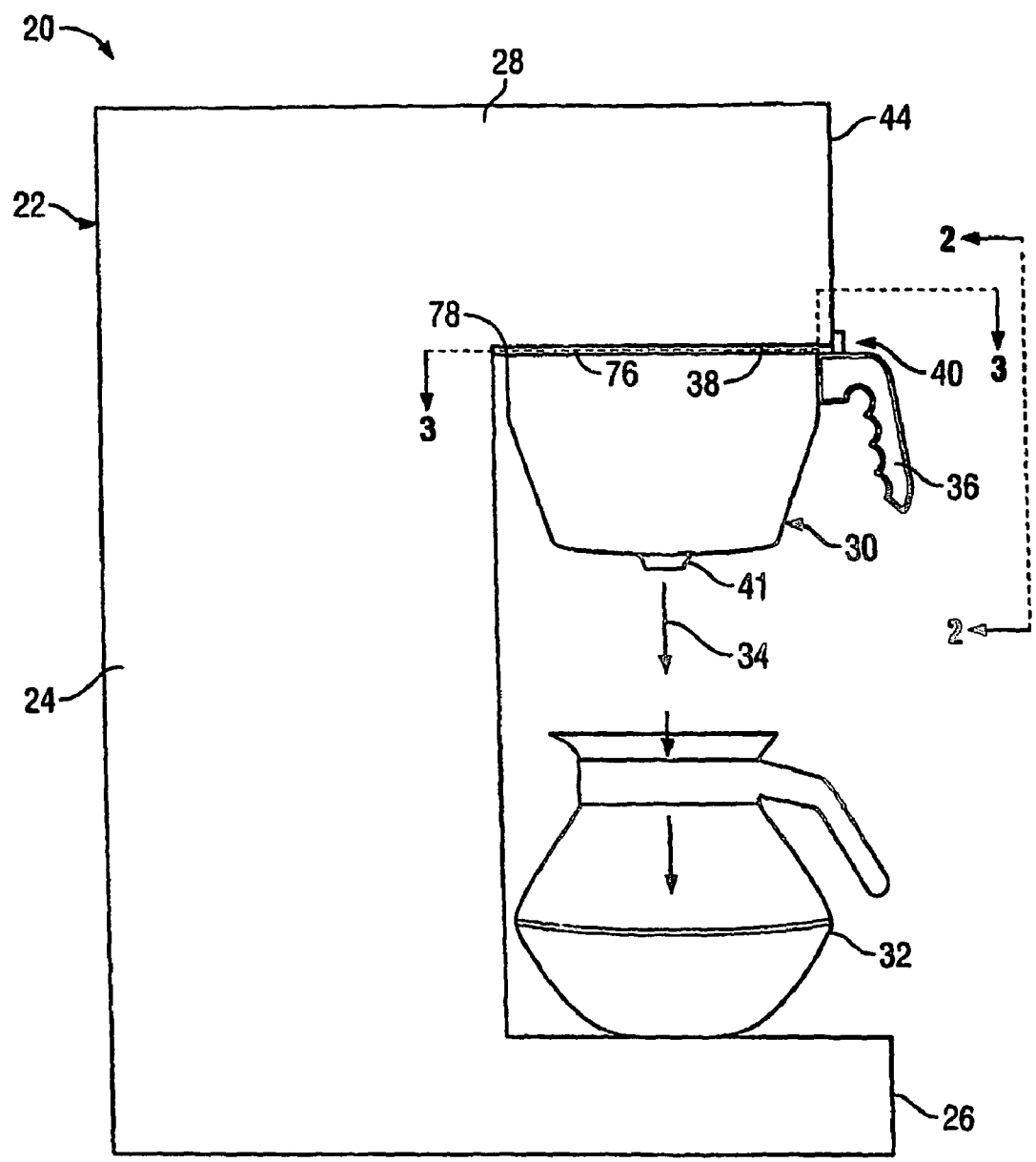
FIG. 1 is a side elevational view of a beverage making machine in which a funnel is positioned on a hood of a beverage making machine.

While the present disclosure may be susceptible to embodiment in different forms, there is shown in the drawings, and herein will be described in detail, embodiments with the understanding that the present description is to be considered an exemplification of the principles of the disclosure and is not intended to limit the disclosure to the details of construction and the arrangements of components set forth in the following description or illustrated in the drawings.

With reference to FIG. 1, a beverage maker, or as referred to in this description for convenience but not as a limitation, a brewer 20 is shown. This brewer 20 may be of the type such as produced by Bunn-O-Matic Corporation, Springfield, Ill. The brewer 20 includes a housing 22 having a trunk 24, a base 26 and an upper portion or extending hood 28. A substance holder, as referred to in this description for convenience but not as a limitation, a funnel 30 is positioned on the hood 28 in a manner which will be described below. The funnel 30 is positioned above a beverage carafe 32 for dispensing a beverage 34 into the carafe 32. The funnel 30 includes a handle 36 which is gripped for positioning the funnel relative to the brewer 20 and removing the funnel 30 from the brewer 20.

During the initiation of a brewing cycle a funnel 30 including a quantity of beverage brewing substance is positioned in relation to the brewer 20 generally at a position along an underside 38 of the hood 28. The beverage brewing cycle is initiated by activating the brewer 20 to dispense a quantity of water into the funnel 30 to produce beverage therein. Beverage 38 is drained through an outlet opening 41 of the funnel 30 and collected in the carafe 32. At the end of the brewing cycle the handle 36 of the funnel 30 is gripped and the funnel 30 is removed from the brewer 20. The saturated or spent brewing substance such as moist coffee grounds can then be disposed of and the funnel 30 prepared for another brewing cycle.

During a brewing cycle it may be desirable to retain the funnel 30 in its position along the underside 38 of the hood 28. As shown in the figures, disclosed is a blocking apparatus or device or a funnel blocking device 40, 40a (FIGS. 8 and 9), 40b (FIG. 10). With reference to the embodiment in FIGS. 1-7, the blocking device 40 is in the form of a displaceable bracket 42. The displaceable bracket 42 is positioned along a front face 44 of the hood 28. The bracket 42 as shown is generally elongated having a first end 46 which is attached to the face 44 by use of a shoulder bolt or other appropriate attacher, attachment or retaining device 48. The bracket 42 is rotatably attached at the attachment device 48 to allow pivoting (50) of the bracket 42 relative to the funnel 30 and the hood 28. The attacher 48 may be any one of attaching devices for attaching at least the first engager 16 to the housing 28. For example, the attacher 48 may be one of the following, but not limited to: threaded fasteners, rivets, pins, springs, weld nuts, bolts, adhesives and adhesive materials, as well as any other structure that might be used for attaching the first engager to the housing 28.

The bracket 42 includes a flange 52 which can be handled or gripped to facilitate manual rotation of the bracket 42. A second end 54 of the bracket 42 includes an elongated slot 56 and an associated guide 58. The bracket pivotably travels (50) about the attachment device 48 with the slot 56 tracking along the guide 58. The result of the pivoting (50) of the bracket 42 can be seen in FIG. 4 in which the bracket 42 has been pivoted to disengage the funnel 30.

It should be noted that other versions, dimensions, shapes and configurations of the bracket 42 can be developed to achieve the same function and method of operation of the present disclosure. As such, this disclosure is intended to be broadly interpreted and not limited to the structures, dimensions, shapes and configurations disclosed herein. For example, the relationship of the slot 56 and guide 58 could be reversed such that the guide can be provided on the bracket 42 with the slot 56 being provided on the face 44 such that pivoting movement (50) of the bracket 42 results in the guide 58 extending from the bracket 42 traveling in the slot 56. Similarly, the bracket 42 could take a different configuration such as being concealed behind the front face 44 yet providing the same or similar function as disclosed in detail herein.

Figure 2:
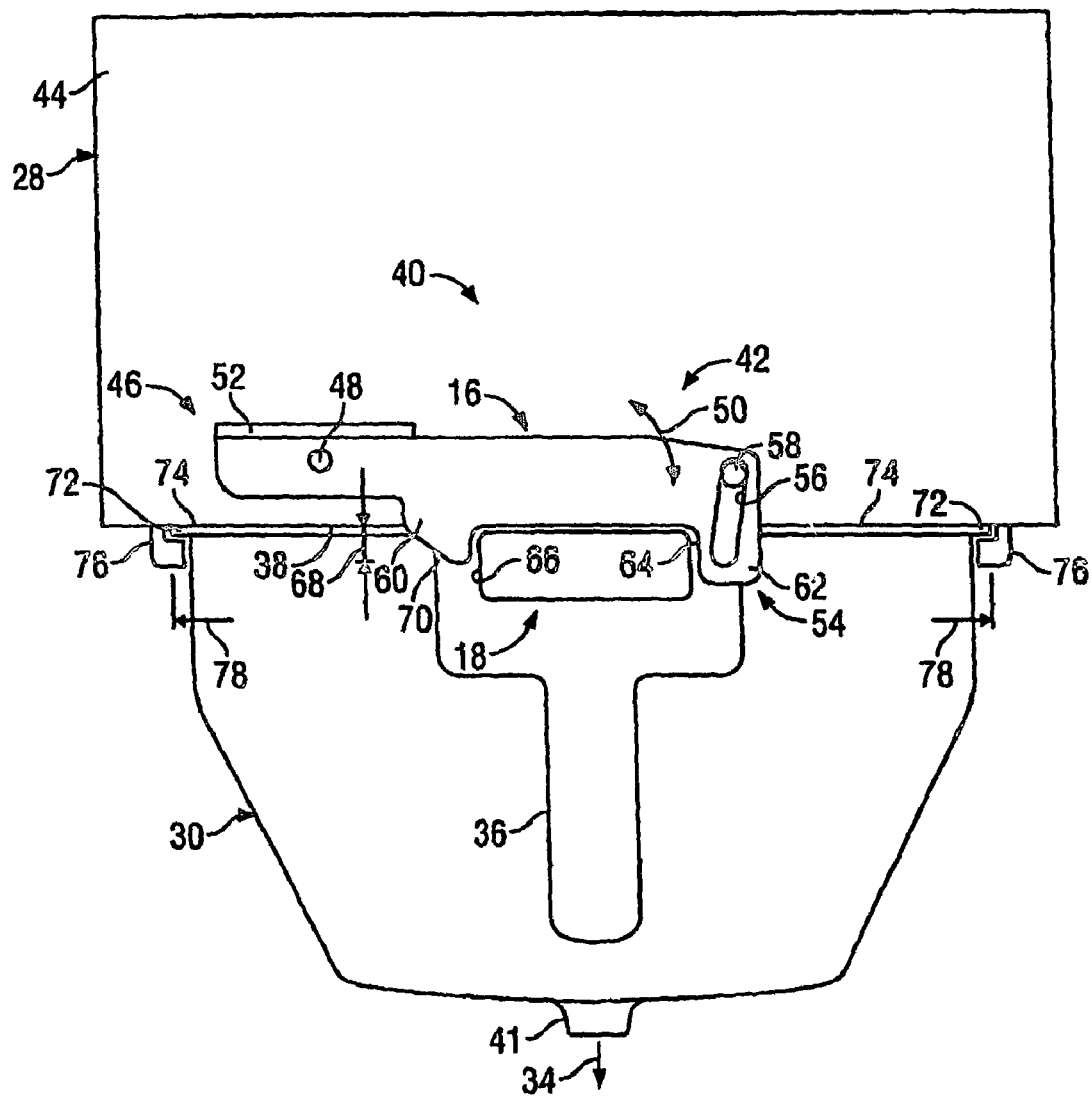
FIG. 2 is an enlarged front elevational view of the funnel in relation to a hood portion taken along line 2-2 in FIG. 1.
Figure 3:
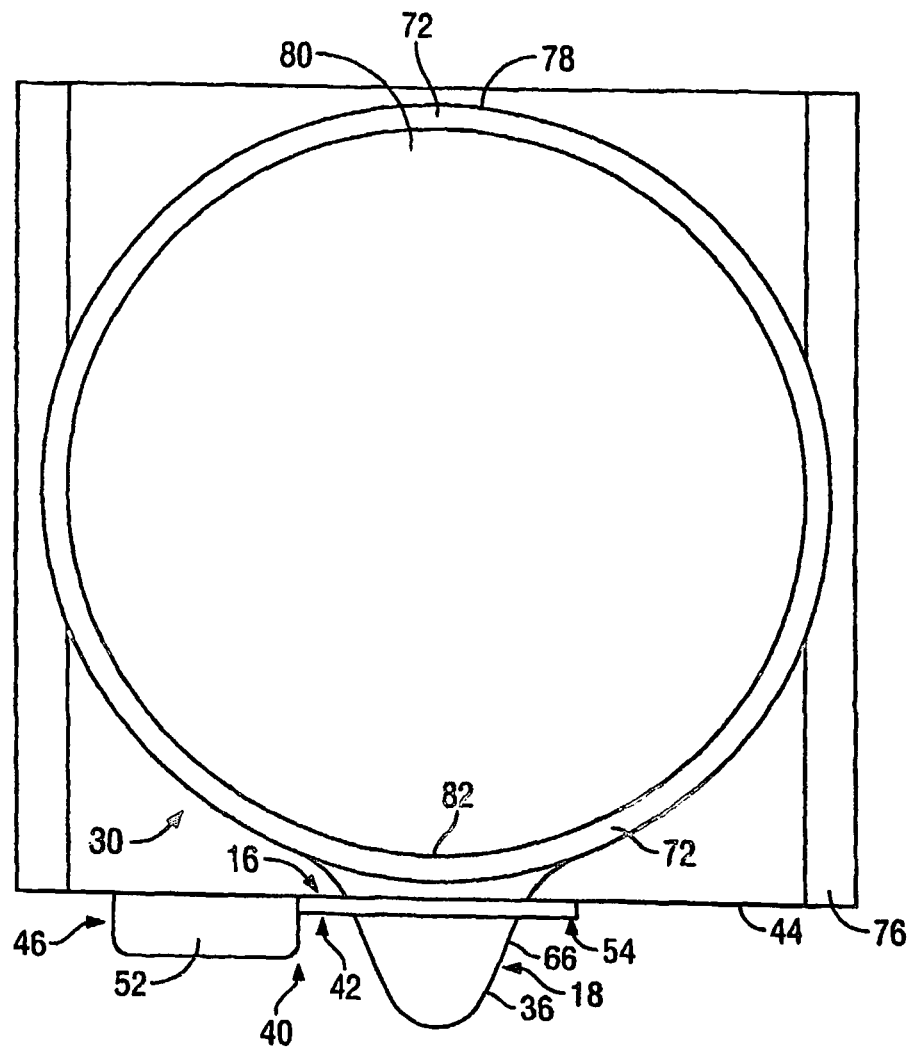
FIG. 3 is a top plan view taken along line 3-3 in FIG. 1 showing a relative position of flanges extending from the funnel engaged with opposing rails and the relationship of a blocking device to the funnel.
Figure 4:
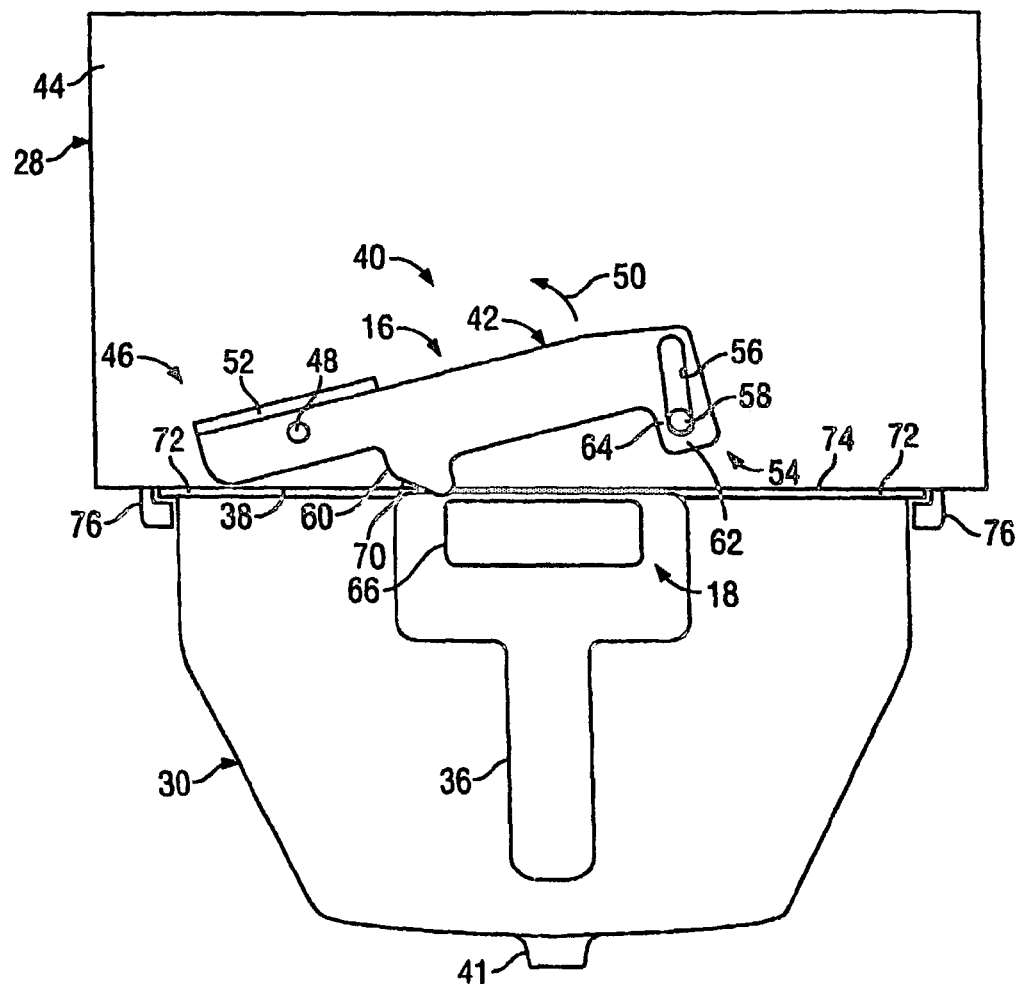
FIG. 4 is a front elevational view as shown in FIG. 2 in which the blocking device has been displaced to allow engagement or disengagement of the funnel relative to the hood.

As shown in FIGS. 2-4, the bracket 42 includes a first extension 60 and a second extension 62. A gap, slot or recess 64 is defined between the spaced apart first and second extensions 60, 62. As shown, the gap 64 of the bracket 42 is sized and dimensioned to engage or straddle a shoulder or protruding portion 66 of the handle 36. Further, the first and second extensions 60, 62 extend downwardly from the face 44 a dimension 68 which block the handle 36 and the funnel 30. It should be noted that the relationship of the slot 64, bracket 42 and portion 66 could be rearranged with the slot 64 being formed in a surface of the portion 66 and sized and dimensioned to receive a corresponding portion of the bracket 42. In either configuration, there a blocking device 40 including a first engager 16, for example the bracket 42, on the maker body 28 and a second engager 18, for example the protruding portion 66, on the funnel 30. The first engager 16 and the second engager 18 engage to prevent unintended removal of the funnel 30 from the maker body 28 until the blocking device 40 has been disengaged to allow movement of the funnel 30 relative to the body 28.

The first engager 16 is normally positioned for engaging the second engager 18. The first engager 16 is displaceable to allow the funnel to be received relative to the housing funnel 30 relative to the housing 28 for retention of the funnel 30 on the housing 28. The first and second engagers 16, 18 are not disengageable unintentionally but require an active selective displacement of the first engager relative to the second engager to disengage the funnel blocking device 40 to permit removable of the funnel 30 relative to the housing 28. In other words, the first and second engagers 16, 18 positively engage the funnel 30 once installed on or positioned relative to the housing.

The embodiment as shown in FIGS. 2-7 includes a shaped or beveled surface 70 on the first extension 60 to help facilitate automatic or unaided displacement of the bracket 42 when inserting the funnel 30 into the brewer 20. In this regard, by way of background, the funnel 30 includes an outwardly extending flange 72, at least extending from opposite sides of the funnel 30 and generally extending circumferentially around a top edge 74 of the funnel. The flange 72 is sized and dimensioned to engage oppositely positioned channels or "rails" 76 attached to the underside 38 of the hood 28. The outwardly extending flange 72 is engaged in open portion of the channel 76 to retain the funnel 30 on the maker 20. The flanges 72 are dimensioned 78 to generally correspond to the dimensions of the channels 76 thereby limiting side to side movement of the funnel 30 positioned in the rails 76.

When installing a funnel 30 between the rails 76, typically a front edge or nose 78 (see FIGS. 1 and 3) is guided into position between the rails 76. The shaped surface 70 is angled or otherwise shaped to facilitate sliding movement over the front edge or other surfaces of the funnel. This surface 70 tends to help facilitate engagement of the funnel blocking device without having to manually rotate the device at the handle 52. When the front curve of the nose 78 is guided between the gap 64 the bracket 42 tends to pivot (50) relative to the attachment device. Once the first and second extensions 60, 62 have moved over the flange 72 they tend to drop into a cavity 80 (see FIG. 3) defined by the funnel 30. As the nose 78 is moved inwardly towards the trunk 24 the first and second extensions 60, 62 contact an interior edge 82 of the funnel 30. In a similar manner as described above, the extensions 60, 62 ride over the flange 72 and drop into position with the protruding portion 66 of the handle 36 engaging the gap 64.

Once the handle 36 is engaged in the gap 64 movement of the funnel 30 relative to the brewer is limited or blocked. Generally, ordinary and reasonable forces applied to the handle 36 withdrawing the funnel 30 from the brewer 20 are resisted by the funnel blocking device 40. In order to remove the funnel 30 from the brewer 20 the bracket 42 must be moved so as to disengage the bracket 42 gap 64 from the shoulder 66 of the handle 36. In the present embodiment, this is accomplished by applying pressure to the flange grip 52. Slight pressure rotates the bracket 42 as shown in FIG. 4 thereby lifting the first and second extensions 60, 62 away from the handle 36 allowing removal of the funnel 30.

This embodiment is mechanical and relies on the force of gravity to return the funnel to the blocking position. This does not require additional steps or mechanisms to effect use of the blocking device 40. Also, the operation of the funnel blocking device 40 is sufficiently convenient so as to deter circumvention of the blocking device 40. In this regard, the ease of use of the funnel blocking device 40 encourages users to use the device and not to disengage it, remove it or otherwise position it so that it does not operate. The funnel blocking device 40 is positioned in close proximity to the handle so as to make it convenient to use when inserting and removing the funnel 30 relative to the brewer 20 and rails 76. The limited amount of force which is required to displace the bracket 42 to remove the funnel 30 and the limited motion does not create an inconvenience for the user.

Figure 5:
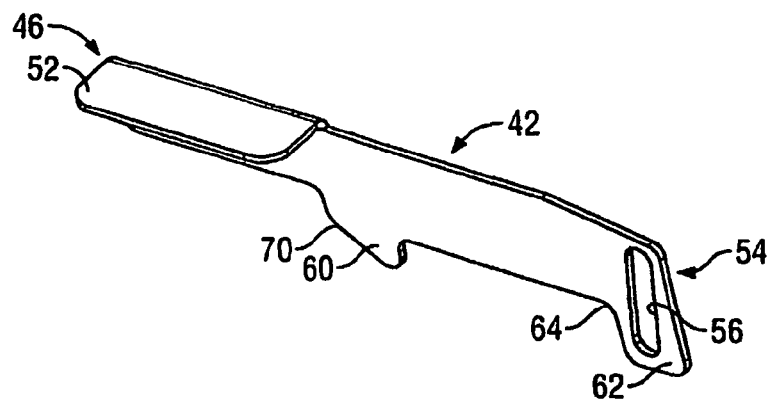
FIG. 5 is a perspective view of the blocking device removed from the machine.
Figure 6:
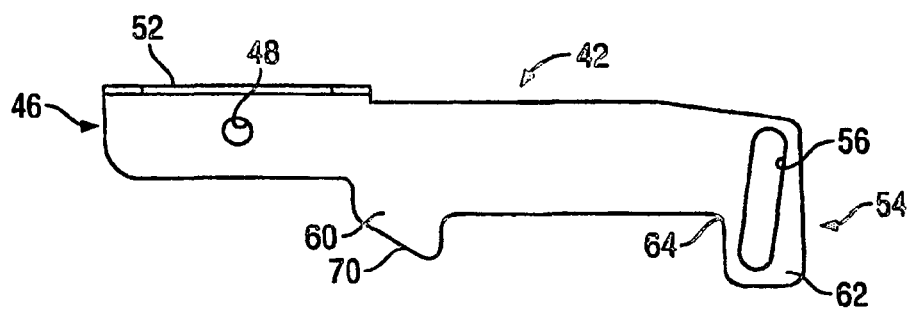
FIG. 6 is a front elevational view of the blocking device as shown in FIG. 5.
Figure 7:
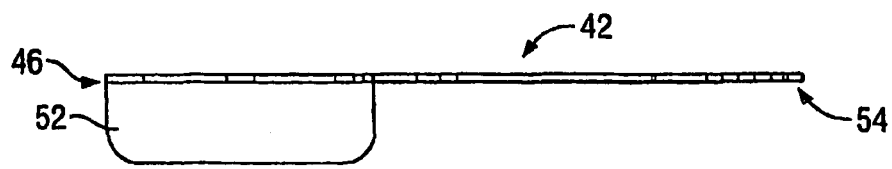
FIG. 7 is a top plan view of the blocking device.

As such, while insertion of the funnel 30 is generally convenient and requires limited or no intervention by the user, removal is prevented or impeded. While removal is prevented or impeded, it is not inconvenient to remove it. Nevertheless, unintended removal is generally prevented by the structure and function of the funnel blocking device 40. FIGS. 5-7 provide additional views of the bracket removed from the maker 20 for clarification of the structures and features of the bracket 42.

Figure 8:
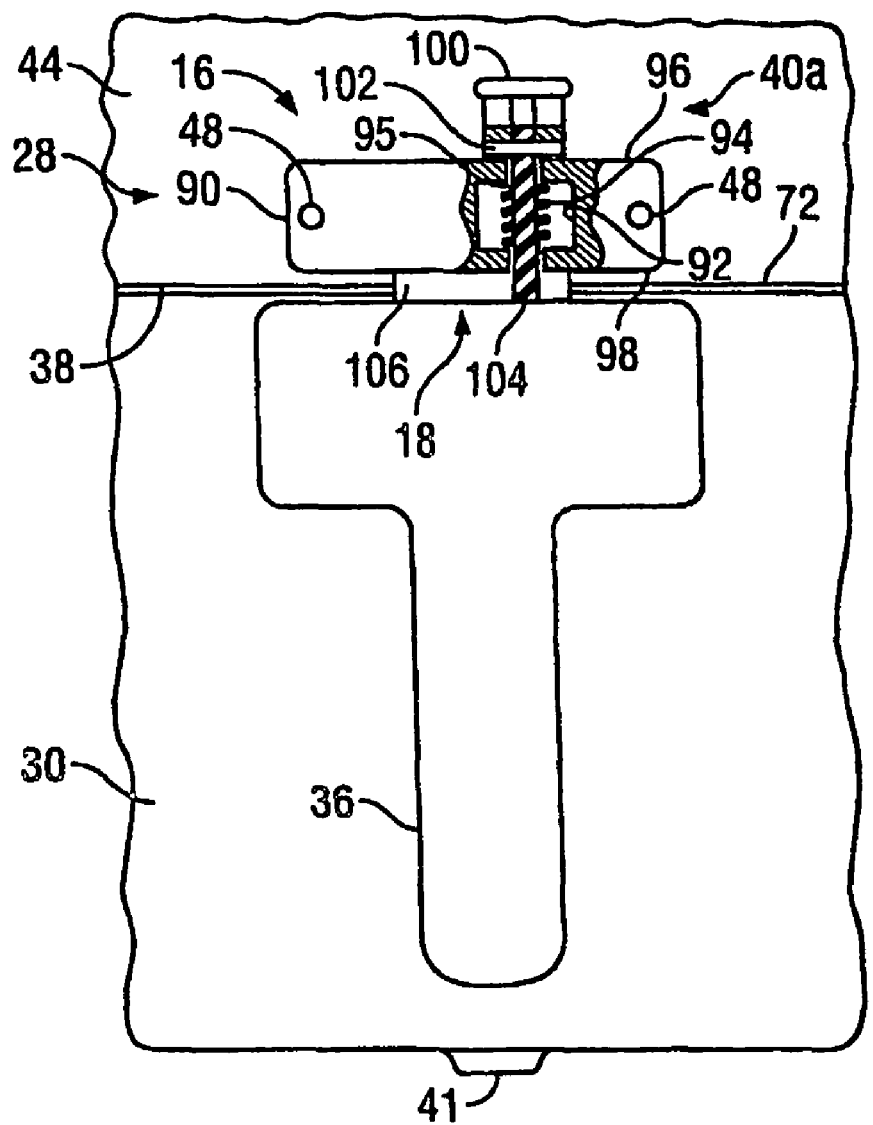
FIG. 8 is an enlarged front, elevational view of a fragmentary portion of the hood and funnel like the one shown in FIG. 2 and showing another embodiment of a blocking device.
Figure 9:
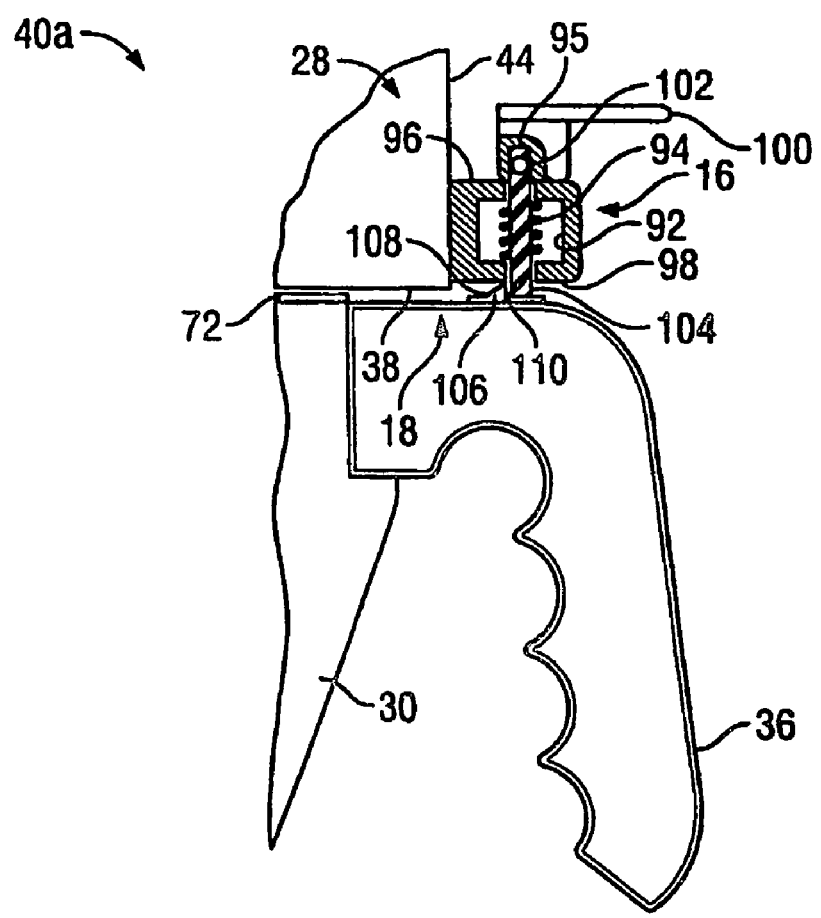
FIG. 9 is a partial fragmentary, side elevational view of the blocking device shown in FIG. 8.
Figure 10:
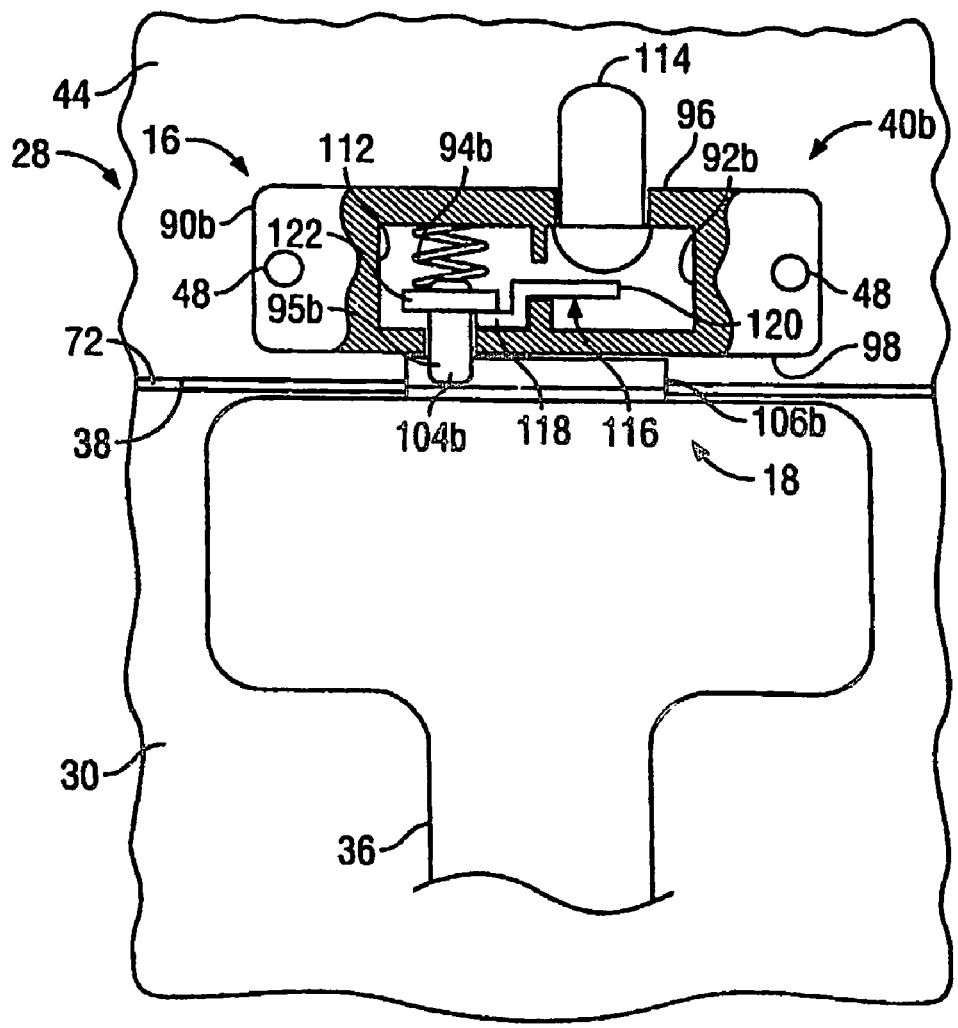
FIG. 10 is an enlarged front, elevational view of another embodiment of a blocking device employing structures on the handle like the structures shown in FIGS. 8 and 9.

Turning now to FIGS. 8 and 9, another embodiment of the blocking device 40*a* is disclosed. The blocking device 40*a* shown in FIGS. 8 and 9 includes many of the same features and functions as disclosed in FIGS. 2-7 as well as additional structures for providing the desired results. In this regard, the blocking device 40*a* provides relatively easy and convenient automatic or unaided engagement of the device 40*a* with the funnel 30 yet provides an impediment to removal of the funnel 30. Additionally, it is relatively easy to intentionally and manually disengage the funnel blocking device 40*a* yet difficult to disengage it inadvertently.

As shown in FIG. 8, the funnel blocking device 40*a* includes a protruding body 90 having a cavity 92 defined therein. As shown in the partially fragmented portion of the body 90, the cavity 92 defines a space in which is retained a spring 94 with a shaft 95 extending from an upper portion 96 of the body, through the cavity 92 and outwardly through a bottom portion 98 of the body 90. A handle 100 is attached to the shaft 95 with a pin 102. The operation of the handle 100 on the shaft 95 operates against the spring 94 such that an extending end 104 of the shaft 95 is spring-biased to extend from the lower portion 98 of the body 90.

A retainer 106 is attached to the handle 36 to provide an abutting engagement of the extending end 104 of the shaft 95. As shown in FIG. 9, the retainer 106 includes a sloped edge 108 and second or flattened edge 110. The sloped edge facilitates engagement of the extending end 104 as the funnel is inserted into the brewer 20. When the funnel slides over the sloped edge 108 it drops under the spring-biased portion of the spring 94 against the flat edge. The flat edge 110 engages the extending portion 104 to prevent unintended removal of the funnel from the brewer.

In this configuration, the blocking device 40*a* including engager 16, for example the body 90 and associated components on the maker body 28 and a second engager 18, for example the retainer 106, on the funnel 30. The first engager 16 engages the second engager 18 to prevent unintended removal of the funnel 30 from the maker body 28 until the blocking device 40*a* has been disengaged to allow movement of the funnel 30 relative to the body 28.

Removal of the funnel from the brewer is accomplished by moving the handle 100 to compress the spring 94 thereby withdrawing the extending end 104 into the body 90 and allowing the retainer 106 to pass under the extending end (now retracted into the body 90).

Turning now to FIG. 10, another embodiment of the funnel blocking device 40*b* is disclosed. The funnel blocking device 40*b* shown in FIG. 10 includes many of the same features and functions as disclosed in FIGS. 2-7 as well as additional structures for providing the desired results. In this regard, the funnel blocking device 40*b* provides relatively easy and convenient engagement of the device 40*b* with the funnel 30 yet provides an impediment to removal of the funnel 30. Additionally, it is relatively easy to intentionally and manually disengage the funnel blocking device 40*b* yet difficult to disengage it inadvertently.

The funnel blocking device 40*b* includes a protruding body 90*b* as shown in FIGS. 8 and 9. Similarly, a cavity 92*b* is provided in the body 90*b*. An additional cavity 112 is provided. A latching pin or shaft 95*b* is displaceably retained in the second cavity 112 and a protruding portion 104*b*. Protruding portion 104*b* engages a retainer 106*b* as described herein above in FIGS. 8 and 9. Generally, the embodiment shown in FIG. 10 works in a similar manner as shown in FIGS. 8 and 9 such that the extending portion 104*b* of the shaft 95*b* is spring-biased to extend out of the body 90*b* and engage the retainer 106*b*. Further, a button or trigger 114 is used to retract the extending portion 104*b* into the body 90*b*.

The mechanism associated with the shaft 95*b* and trigger 114 includes a biasing spring 94*b* and a rocker arm or trigger lever 116. The spring 94*b* biases the shaft 95*b* to extend the extending portion 104*b* out of the body 90*b*. The rocker arm 116 has a first portion 118 which is also biased downwardly in the cavity 112. A second end 120 of the rocker arm 116 can be contacted by the trigger 114 to press the spring 94*b* and withdraw the shaft 95*b* into the body 90*b*. A shoulder 122 is positioned above the first end 118 such that upward movement of the rocker arm 116 by actuation of the trigger 114 lifts the shaft 95*b* away from the retainer 106*b*.

In this configuration, the blocking device 40*b* including a engager 16, for example the body 90*b* and associated components on the maker body 28 and a second engager 18, for example the retainer 106*b*, on the funnel 30. The first engager 16 engages the second engager 18 to prevent unintended removal of the funnel 30 from the maker body 28 until the blocking device 40*b* has been disengaged to allow movement of the funnel 30 relative to the body 28.

The embodiments of the blocking devices 40, 40*a*, 40*b* include methods of using the devices. In this regard, each of the first engager 16 and the second engager 18 of the devices are generally positioned in close proximity to the funnel 30 and the funnel handle 36. Each of the devices engages a portion of the funnel handle and/or funnel to prevent inadvertent disengagement of the funnel 30 from the brewer 20. Each of the devices generally, automatically or without aid, do not require intervention to move the funnel 30 into position on the maker 20. However, each of the devices requires a manual action to disengage the first engaging structure and the second engaging structure to move the device from a blocking position relative to the funnel. The blocking devices require a user to think before acting to disengage the funnel from the beverage making machine. Further, each of the devices also is relatively resistant to inadvertent disengagement.

Using the funnel blocking device 40, 40*a*, 40*b* a funnel is positioned in close proximity to the brewer generally oriented for engaging the first and second engaging structures of the blocking device 40, 40*a*, 40*b*. The nose 78 of the funnel 30 is positioned as the leading edge to engage the brewer 20. In the device as shown in FIGS. 2-7, the leading edge contacts the surface 70 and tends to move the bracket 42 out of the way. Similarly, a trailing edge 82 has a similar influence on the bracket. However, once the bracket 42 gap 64 is engaged with the shoulder 66 of the handle, the funnel 30 cannot be easily removed from the brewer 20. In a similar manner, the embodiments shown in FIGS. 8-10 include an extending portion 104, 104*b*. The extending portions 104, 104*b* can be bypassed by the leading edge 78 if there is any minor interference between the funnel and the leading edge 104, 104*b*. However, it should be noted that generally the leading edges 104, 104b do not extend in an interfering relationship with the funnel. These extending portions 104, 104b are oriented and configured to cause an interfering or engaging relationship with the retainer 106, 106b. The retainer 106, 106b is configured with a sloped edge 108 and a straight edge 110 to minimize or eliminate the need to retract the extending end 104, 104b.

Once the funnel has been installed and the brewing process completed the blocking device 40, 40a, 40b can be moved to disengage the funnel from the blocked or retained position relative to the brewer. Each of these disengaging steps or actions is described above with regard to the respective embodiments.

It is also envisioned in this disclosure that while the embodiments described herein are generally of a mechanical and manually operated construction, mechanical and electrical devices can be developed for use in conjunction with the funnel blocking devices 40, 40a, 40b to provide a blocking function. In this regard, controllable solenoids could be incorporated with the brewer with sensors and interfacing mechanisms associated with the brewer and the blocking devices so as to controllably operate the blocking devices. In this regard, an electro-mechanical device could be coupled with any one of the blocking devices 40, 40a, 40b to controllably disengage the blocking device from the funnel upon the occurrence of a particular circumstance or set of circumstances. Sensors of known construction could be located relative to the funnel or elsewhere to provide information which would indicate when the blocking device could be disengaged.

While a preferred embodiment of the disclosure is shown and described, it is envisioned that those skilled in the art may devise various modifications and equivalents without departing from the spirit and scope of the disclosure and the claims set forth herein.

The invention claimed is:

1. A blocking device for use with a beverage making machine having a housing and funnel positionable relative to the housing, the blocking device preventing unintended disengagement of a funnel from a corresponding housing, the blocking device comprising:
    a body positionable on a housing, the body defining a cavity therein;
    a shaft cooperatively associated with the body and extending through at least a portion of the cavity:
    a biasing member associated with the shaft and retained in the cavity for biasing the shaft in a normally extending engaging position;
    a handle coupled to the shaft for opposing the biasing force of the biasing member to facilitate disengagement of the shaft from a second engager carried on a funnel.

2. The blocking device of claim 1, the second engager comprising a sloped edge oriented for abutting a corresponding surface of the shaft extending from the body, a second edge positioned proximate to the sloped edge for resisting disengagement of the shaft after engagement with the second engager.

3. The blocking device of claim 2 further comprising the handle being operable to displace the shaft a dimension generally equal to the corresponding dimension of the second edge to facilitate clearing the shaft when removing a funnel from the housing, the handle operating against the biasing force of the biasing member to displace the shaft.

4. The blocking device of claim 2 further comprising a trigger and an associated trigger lever, the trigger and trigger lever being operatively associated with the body for displacing the shaft against the biasing member to facilitate disengagement of a funnel from a housing.

5. A beverage making machine having a housing, a funnel positionable relative to the housing, and a funnel blocking device for preventing unintended disengagement of the funnel from the housing, the funnel blocking device comprising:
    a first engager including a body positionable on at least one of the housing and the funnel, the body including a cavity;
    a second engager positioned on the other of the housing and funnel;
    a shaft carried on the body and extending through at least a portion of the cavity;
    a biasing member associated with the shaft and retained in the cavity for biasing the shaft in a normally extending engaging position;
    a handle coupled to the shaft for opposing the biasing force of the biasing member for facilitating disengagement of the shaft from the second engager; and
    whereby the first and second engagers are engageable to prevent unintended removal of the funnel from the housing and selectively disengageable for removal of the funnel from the housing.

6. The beverage making machine of claim 5, at least one of the first and second engagers including an extending portion which is normally positioned relative to the housing for engagement with the other of the first and second engagers.

7. The beverage making machine of claim 6, the extending portion being displaceable when receiving a funnel on the housing and engageable with the second engager.

8. The beverage making machine as in claim 7, further comprising the first engager including the extending portion being displaceable upon movement of a funnel to position on the housing and being positively engaged with the second engager, the first engaer requiring a force to be applied thereto for disengaging the first engager from the second engager.

9. The beverage making machine of claim 5, further comprising the first engager having a biased extending structure normally biased extending for engagement with a second engager, the second engager being carried on the funnel, positioning of the funnel and the corresponding second engager biasedly engaging the biased extending structure for retaining the funnel against unintended removal from the housing.

10. The beverage making machine as in claim 5, the second engager comprising a sloped edge oriented for abutting a portion of the first engager, a second edge positioned proximate to the sloped edge for resisting disengagement of the portion of the first engager after engagement with the second engager.

11. The blocking device of claim 5, at least one of the first and second engagers including an extending portion which is normally positioned when attached to a housing for engagement with the other of the first and second engagers.

12. The blocking device of claim 11, the extending portion being displaceable when receiving a funnel on the housing and engageable with the second engager.

13. The blocking device of claim 12, further comprising the first engager including the extending portion being displaceable upon movement of a funnel to position on a corresponding housing and being positively engaged with the second engager, the first engager requiring a force to be applied thereto for disengaging the first engager from the second engager.

14. The blocking device of claim 5, further comprising the first engager having a biased extending structure normally biased extending for engagement with a second engager, the second engager being carried on a funnel, positioning of a funnel and the corresponding second engager biasedly engaging the biased extending structure for retaining a funnel against unintended removal from a corresponding housing.

15. A blocking device for use with a beverage making machine having a housing and a funnel positionable relative to a corresponding housing, the blocking device preventing unintended disengagement of a funnel from a corresponding housing, the blocking device comprising:
   a first engager including a body positionable on at least one of a housing and the funnel, the body including a cavity;
   a second engager positioned on the other of the housing and funnel;
   a shaft cooperatively associated with the body and extending through at least a portion of the cavity;
   a biasing member associated with the shaft and retained in the cavity for biasing the shaft in a normally extending engaging position;
   a handle coupled to the shaft for opposing the biasing force of the biasing member to facilitate disengagement of the shaft from the second engager; and
   whereby the first and second engagers are engageable when associated with a funnel and a housing to prevent unintended removal of a funnel from a corresponding housing and selectively disengageable for removal of a funnel from a corresponding housing.

16. The blocking device of claim 15, the second engager comprising a sloped edge oriented for abutting a portion of the first engager, a second edge positioned proximate to the sloped edge, for resisting disengagement of the portion of the first engager after engagement with the second engager.

17. A blocking device for use with a beverage making machine having a housing and a funnel positionable relative to the housing, the blocking device preventing unintended disengagement of a funnel from a corresponding housing, the blocking device comprising:
   a bracket pivotably retained on the housing of the beverage making machine;
   a first extension and a second extension extending from the bracket extending from the housing for interfering with movement of a funnel retained on the housing;
   a second engagement portion on the funnel for cooperative engagement with the bracket;
   the first and second extensions being spaced apart and defining a gap on the bracket for cooperative engagement with the second engager on the funnel to facilitate retaining the funnel on the housing against unintended disengagement from the housing and facilitating selective disengagement of the funnel from the housing.

18. The blocking device of claim 17 further comprising: a first end of the bracket being pivotable relative to the housing; a second end of the bracket providing displaceable retention of the second end on the housing for facilitating limited movement of the bracket relative to the housing.

19. The blocking device of claim 18 further comprising: a slot formed in the second end of the bracket and a guide attached to the housing, the guide riding in the slot for limiting the range of movement of the bracket relative to the first end.

20. The blocking device of claim 17, the bracket further comprising a shaped surface on the first extension being shaped for facilitating displacement of the bracket while engaging a funnel against the shaped surface.

21. A method of retaining a funnel on a beverage making machine against unintentional removal, the beverage making machine having a housing with the funnel being positionable relative to the housing, the method comprising the steps of:
   providing a blocking device;
   providing a first engager of the blocking device including a bracket displaceably attached to the housing of the beverage making machine, the bracket having a first extension and a second extension defining a gap therebetween;
   a second engager positioned on the funnel and sized and dimensioned for engagement in the gap of the first engager;
   positioning the funnel in relation to the beverage making machine for engagement therewith and facilitating making a beverage;
   positioning the second engager carried on the funnel in close proximity the first engager;
   pushing the second engager against first extension of the first engager;
   displacing the first engager against which the second engager presses to facilitate movement of the funnel into engagement with the housing; and
   displaceably returning the first engager to a normally extending position with the second engager engaged in the gap of the first engager.

22. The method of claim 21 further comprising the step of: selectively disengaging the first and second engagers to facilitate selective removal of the funnel from the housing.

23. The method of claim 21 further comprising: providing a pivot first engager in the form of a pivotable bracket; pivotably attaching the bracket to the housing in a position for engaging a portion of the funnel.

24. The method of claim 21 further comprising: a slot defined on the bracket; and selectively positioning the slot in engagement with the second engager for engaging the funnel on the housing.

25. The method of claim 21 further comprising: providing an extending shaped portion from the first extension of the first engager for receiving a force from the funnel to displace the first engager relative to the funnel.

26. The method of claim 21 further comprising: providing a biased extending portion; biasing the extending portion in a normally extended position; positioning the funnel in a location to engage the normally extending biased portion with the second engager.

27. The method of claim 26 further comprising: selectively displacing the biased extending portion away from the second engager for disengaging the first engager from the second engager; and retaining the biased extending portion out of engagement with a second engager for removal of the funnel from the housing; and releasing the biased extending portion for extending engagement with a subsequent funnel.

* * * * *